United States Patent [19]
Yoo et al.

[11] Patent Number: 4,957,718
[45] Date of Patent: Sep. 18, 1990

[54] PROCESS FOR REDUCING EMISSIONS OF SULFUR OXIDES AND COMPOSITION USEFUL IN SAME

[75] Inventors: Jin S. Yoo, Flossmoor, Ill.; John A. Karch, Marriottsville; Alakananda A. Bhattacharyya, Columbia, both of Md.; Cecelia A. Radlowski, Riverside, Ill.

[73] Assignee: UOP, Des Plaines, Ill.

[21] Appl. No.: 124,618

[22] Filed: Nov. 24, 1987

[51] Int. Cl.$^5$ .............................................. B01D 53/04
[52] U.S. Cl. .................................... 423/244; 208/113; 208/120; 423/215.5; 423/247
[58] Field of Search ...................... 423/215.5, 247, 244; 208/120, 113

[56] References Cited

U.S. PATENT DOCUMENTS

| 3,714,328 | 1/1973 | Nicklin et al. | 423/244 R |
|---|---|---|---|
| 4,001,376 | 1/1977 | Cull et al. | 423/244 R |
| 4,039,478 | 8/1977 | Cull et al. | 423/244 R |
| 4,055,513 | 10/1977 | Wheelock | 502/306 |
| 4,170,627 | 10/1979 | Ginger | 423/244 R |
| 4,239,742 | 12/1980 | Blaton, Jr. | 423/244 R |
| 4,251,496 | 2/1981 | Longo et al. | 423/244 R |
| 4,263,020 | 4/1981 | Eberly, Jr. | 423/244 R |
| 4,325,817 | 4/1982 | Bartholic et al. | 208/120 |
| 4,369,108 | 1/1983 | Bertolacini et al. | 423/244 R |
| 4,381,991 | 5/1983 | Bertolacini et al. | 423/244 R |
| 4,405,443 | 9/1983 | Bertolacini et al. | 423/244 R |
| 4,492,678 | 1/1985 | Yoo et al. | 423/244 R |
| 4,636,371 | 1/1987 | Farha, Jr. | 423/244 R |
| 4,690,806 | 9/1987 | Schorfheide | 423/244 R |

*Primary Examiner*—Helane Myers
*Attorney, Agent, or Firm*—Vincent J. Vasta, Jr.; Thomas K. McBride

[57] ABSTRACT

A process for the removal of sulfur oxides from a gas which comprises (a) contacting the sulfur oxide-containing gas with at least one of certain metal, oxygen-containing components, e.g., modified perovskite-type components, at conditions effective to associate at least a portion of the sulfur oxides with the component to reduce the amount of sulfur oxides in the gas; and (b) contacting the component containing associated sulfur oxides at conditions effective to reduce the amount of sulfur associated with the component.

15 Claims, No Drawings

PROCESS FOR REDUCING EMISSIONS OF SULFUR OXIDES AND COMPOSITION USEFUL IN SAME

BACKGROUND OF THE INVENTION

This invention relates to processes effective to reduce emission of sulfur oxides, e.g., to the atmosphere, and to compositions useful in such processes. In one specific embodiment, the invention involves a process for catalytic cracking sulfur-containing hydrocarbon feedstocks in a manner to effect a reduction in the amount of sulfur oxides emitted from the regeneration zone of a hydrocarbon catalytic cracking unit and to a catalyst composition useful in such catalytic cracking process.

Typically, catalytic cracking of hydrocarbons takes place in a reaction zone at hydrocarbon cracking conditions to produce at least one hydrocarbon product and to cause carbonaceous material (coke) to be deposited on the catalyst. Additionally, some sulfur, originally present in the feed hydrocarbons may also be deposited, e.g., as a component of the coke, on the catalyst. It has been reported that approximately 50% of the feed sulfur is converted to $H_2S$ in the FCC reactor, 40% remains in the liquid products and about 10% is deposited on the catalyst. These amounts vary with the type of feed, rate of hydrocarbon recycle, steam stripping rate, the type of catalyst, reactor temperature, etc.

Sulfur-containing coke deposits tend to deactivate cracking catalyst. Cracking catalyst is advantageously continuously regenerated, by combustion with oxygen-containing gas in a regeneration zone, to low coke levels, typically below about 0.4% by weight, to perform satisfactorily when it is recycled to the reactor. In the regeneration zone, at least a portion of sulfur, along with carbon and hydrogen, which is deposited on the catalyst, is oxidized and leaves in the form of sulfur oxides, i.e., $SO_2$, $SO_3$ and mixtures thereof, along with substantial amounts of CO, $CO_2$ and $H_2O$.

Considerable recent research effort has been directed to the reduction of sulfur oxide emissions from the regeneration zones of hydrocarbon catalytic cracking units. One technique involves circulating one or more metal oxides, capable of associating with oxides of sulfur, with the cracking catalyst inventory in the regeneration zone. When the particles containing associated oxides of sulfur are thereafter circulated to the reducing atmosphere of the cracking zone, the associated sulfur compounds are released as gaseous sulfur-bearing material, such as hydrogen sulfide, which is discharged with the products from the cracking zone in a form which can be readily handled in a typical facility, e.g., a petroleum refinery. The metal oxide reactant is regenerated to an active form, and is capable of further associating with sulfur oxides when cycled to the regeneration zone.

U.S. Pat. No. 4,472,267 presents a summary of the early published work on reducing sulfur oxide emissions from catalytic cracking units.

Perovskites have been disclosed as cracking catalysts. See U.S. Pat. No. 4,055,513. The ideal perovskite crystalline structure is defined by the empirical formula $ABO_3$ in which A and B are cations of two different metals and in which the A cation is coordinated to twelve oxygen atoms while the B cation occupies octahedral sites and is coordinated to six oxygen atoms. For example, the compound $LaMnO_3$ has the ideal perovskite structure while other materials, such as $La_{0.7}Sr_{0.3}MnO_3$, which exhibit a variety of other structures are still classed as perovskite-type components. U.S. Pat. No. 4,055,513 does not disclose, and is not concerned with, reducing sulfur oxide emissions.

The mineral perovskite ($CaTiO_3$) possesses a cubic crystal structure at elevated temperatures. An extensive discussion of "PEROVSKITE-RELATED OXIDES AS OXIDATION-REDUCTION CATALYSTS" has been presented by R. J. H. Voorhoeve in Chapter 5 of "Advanced Materials in Catalysis", J. J. Buraton and R. L. Garten, Academic Press (1977). In addition, properties of perovskite-type catalysts have been reported by Nakamura et al. in "Bulletin of Chemical Society of Japan", vol. 55 (1982) at pages 394–399, and in "Journal of Catalysis", vol. 83 (1983) at pages 151–159; and by Happel et al, in "Ind. Eng. Chem. Product Research Development", vol. 14 (1975) at pages 164–168. Catalyst preparation has been discussed by Johnson et al. in "Ceramic Bulletin", vol. 56 (1977) at pages 785–788; and in U.S. Pat. No. 4,055,513. Nakamura et al. investigated oxidation-reduction properties of lanthanum cobaltate, substituted with a minor proportion of strontium, in the oxidation of carbon monoxide and reduction of nitric oxide, as in automotive exhausts, and extended their studies to include oxidation of methanol and propane. Happel et al. employed lanthanum titanate for the reduction of $SO_2$ to elemental sulfur, with carbon monoxide. Johnson et al. prepared lanthanum manganates, substituted with either strontium or lead, impregnated on ceramic supports for more homogeneous distribution and higher activity for CO oxidation. In U.S. Pat. No. 4,055,513, supported perovskites were prepared in which the support comprised a metal oxide, such as alumina, having a surface coating of a spinel.

Cobaltate perovskites have been suggested as substitutes for noble metals in electro-reactions and as catalysts for use in the oxidation of CO in automotive exhausts as well as for the reduction of NO therein. Such catalysts have found little use in automotive systems because of their deactivation by sulfur oxides. See the work presented by R. J. H. Voorhoeve, noted above.

There continues to be a need for materials used for reducing sulfur oxide atmospheric emissions, in particular from hydrocarbon conversion operations.

SUMMARY OF THE INVENTION

A composition and process useful for the removal of sulfur oxides from a gas has been discovered. In one general aspect, the present process comprises contacting a sulfur oxide-containing gas with at least one of certain metal, oxygen-containing components (hereinafter referred to as MOCs) at conditions effective to associate sulfur oxides with the MOC to reduce the sulfur oxide content of the gas; and contacting the MOC containing associated sulfur oxides at conditions effective to reduce the sulfur, e.g., sulfur oxide, content of the MOC. In another general aspect, the invention involves a composition of matter comprising, in intimate admixture, a major amount of solid particles capable of promoting hydrocarbon conversion and a minor amount of different discrete entities comprising at least one MOC. In a further general aspect, the invention involves a process for converting a sulfur-containing hydrocarbon feedstock using the present composition as catalyst. Reduced sulfur oxide atmospheric emissions are achieved.

The present invention provides substantial advantages. For example, the presently useful MOCs often have substantial capacity to associate and disassociate with sulfur oxides. This property or feature allows the MOCs to be used repeatedly or cyclicly to remove sulfur oxide from gas. In addition, the MOC may have certain hydrocarbon conversion catalytic properties which enhance the catalytic performance or overall performance of the present composition of matter and hydrocarbon conversion process. In many instances, the present MOCs can be utilized in a hydrocarbon conversion, e.g., cracking, process in which the catalyst regeneration zone is operated in a partial combustion mode. Further, the presently useful MOCs are relatively easy to manufacture and are effective to reduce sulfur oxide atmospheric emissions.

DISCUSSION OF THE INVENTION

One embodiment of the present invention involves contacting sulfur oxide-containing gases, e.g., combustion products from combustion zones, with one or more of the presently useful MOCs. Reduced emission of sulfur oxides, e.g., reduced atmospheric emission of sulfur oxides from the combustion zones, are achieved as a result of this contacting.

Conditions within such contacting zones are effective to associate at least a portion of the sulfur oxide in the gas with the MOC. For example, such conditions often include those typically used in contact zones employing conventional sulfur oxide removal agents. The amount of the presently useful MOC used to contact a sulfur oxide-containing gas is sufficient to reduce the sulfur oxide content of the gas, preferably, by at least about 50% and more preferably by at least about 80%. The MOC containing associated sulfur oxides may be contacted at conditions effective to reduce the amount of sulfur, e.g., sulfur oxides, associated with the MOC. This sulfur oxide reduction contacting preferably occurs such that at least about 50% and more preferably at least about 80% of the sulfur associated with the MOC is removed.

Such reduction conditions preferably include temperatures in the range of about 900° F. to about 1800° F. and pressures in the range of about 0 psig to about 100 psig. A reducing medium, e.g., hydrogen, hydrocarbon and the like, is preferably present. The amount of reducing medium present is preferably such that the mole ratio of reducing medium to associated sulfur is in the range of about 1 to about 10. Once the amount of associated sulfur oxide is reduced the MOC can be cycled back to the sulfur oxide contacting step, this cyclic process can be carried out repeatedly.

The presently useful MOC may be present in the combustion zone. Typical combustion zones include, for example, fluid bed coal burning steam boilers and fluid sand bed waste combustors. In the coal fired boiler application, the present MOC may be added, either separately or with the sulfur-containing coal, to the combustion zone, e.g., boiler, where combustion takes place. The present MOC then leaves the combustion zone with the coal ash and can be separated from the ash, e.g., by screening, density separation, or other well known solids separation techniques.

In one embodiment, the sulfur oxide-containing gases are contacted with the presently useful MOC at conditions to reduce the sulfur oxide content of the gases in one or more zones, e.g., separate from the combustion zone. In any event, the flue gases leaving the combustion zone/contacting zone system have reduced amounts of sulfur oxide, e.g., relative to processing in the absence of the presently useful MOC.

In one embodiment, the metal, oxygen-containing component, MOC, useful in the present invention has an empirical formula selected from the following:

(1) $A_{1-x}M_xB_{1-y}M'_yO_{3-z}$, (2) $A_2B_2O_{7-w}$ and (3) $A_{2-u}M_uB_{2-v}M'_vO_{7-w}$ in which A is selected from the group consisting of lanthanide series metals, alkaline earth metals, sodium, potassium, cesium and mixtures thereof; M is different from A, B and M' and is selected from the group consisting of alkaline earth metals, Group VIII metals, manganese, lead, zinc, thorium, yttrium, cerium and mixtures thereof; B and M' are different from each other, preferably having higher oxidation states than A and M, and are independently selected from the group consisting of Group VIII metals, magnesium, titanium, manganese, copper, aluminum, niobium, tantalum, chromium, gallium, zirconium, vanadium, molybdenum, antimony, bismuth, tin, tungsten and mixtures thereof. The symbol x and y are independently selected between and including zero (0) and 1 so that the total number of positive charges from A, M, B and M' in empirical formula (1) is within the range of about 5 to about 7, preferably about 5.5 to about 6.5 and in particular about 6. The symbols u and v are independently selected between and including zero (0) and 2 so that the total number of positive charges from A, M, B and M' is within the range of about 12 to about 16, preferably about 13 to about 15 and in particular about 14. The symbol z is in the range of about $-0.5$ to about 0.5. The symbol w is in the range of about $-1$ to about 1. With regard to (1) above, not all of x, y and z are zero (0). When B is niobium, A is selected from sodium, potassium, cesium and mixtures thereof. Preferably, the symbol z is in the range of about $-0.25$ to about 0.25, and the symbol w is in the range of about $-0.5$ to about 0.5.

The MOC's included in the empirical formula (1) may be referred to as modified perovskite-type components or MPCs. In the MPC's, the metals, i.e., A, M, B and M' are preferably sized so as to be theoretically capable of being accommodated in an ideal perovskite structure, as described above. Ilmenites and modified ilmenites ar also included in the MOCs having empirical formula (1). For ease of identification all the MOCs included in empirical formula (1) shall be hereinafter referred to as modified perovskite-type components or MPCs.

The MOCs included in empirical formula (2) are often referred to as pyrochlores, while the MOCs included in empirical formula (3) can be referred to as modified pyrochlores.

In one embodiment, the presently useful MOC has an empirical formula such that the amount of contained oxygen is reduced relative to that amount required to charge balance the component. Such MOCs can be said to have an oxygen deficiency or deficit. This oxygen deficiency may play a role in the effectiveness of such MOCs in reducing sulfur oxide emissions. In any event, such oxygen deficient MOCs are useful as sulfur oxide reduction or removal agents. In addition, the presently useful oxygen deficient MOC's may have beneficial catalytic properties, e.g., as a catalyst to promote the conversion, in particular the cracking, of hydrocarbons. Preferably, the oxygen deficient MOCs include more than one metal and/or one metal in two different oxidation states. The extent of the oxygen deficiency is preferably less than about 20%, more preferably less than about 10%. In other words, the amount of oxygen included in the oxygen deficient MOCs is preferably more than about 80%, and more preferably more than about 90%, of the oxygen required to fully charge balance the MOC. Examples of such oxygen deficient MOCs include certain of those MOCs having empirical formulas (1), (2) and (3) above, where z and w are positive.

The presently useful MOCs may be a crystalline compound, an amorphorous compound, a solid solution, or other form of material. The fresh or virgin MOC preferably comprises one or more metals and oxygen, and is substantially free of other elements, in particular such elements which may have a substantial detrimental effect on the use of the MOC as a sulfur oxide reduction or removal agent.

The lanthanide series metals are often referred to as the rare earth metals. These include lanthanum, cerium, praseodymium, neodymium, promethium, samarium, europium, gadolinium, terbium, dysprosium, holmium, erbium, thulium, ytterbium and lutetium.

Various metals are preferred for use in the MOCs, in particular the MPCs. For example, A is preferably selected from the group consisting of lanthanide series metals and mixtures thereof, in particular lanthanum, cerium, neodymium and mixtures thereof. The metal M is preferably selected from the group consisting of alkaline earth metals, cobalt, iron, nickel, manganese and mixtures thereof. The metal B is preferably selected from the group consisting of cobalt, iron, nickel, ruthenium, titanium, vanadium, manganese, copper, aluminum, chromium, gallium and mixtures thereof. The metal M' is preferably selected from the group consisting of magnesium, aluminum, vanadium, the platinum group metals and mixtures thereof.

As noted above, not all of x, y and z are zero in any one MPC. For example, x may be in the range of about 0.01 to about 0.99, preferably about 0.05 to about 0.9, and y equal to zero. Conversely, x may be equal to zero and y may be in the range of about 0.01 to about 0.99, preferably about 0.05 to about 0.9. In one embodiment, x and y are independently in the range of about 0.to 01 to about 0.99, more preferably about 0.05 to about 0.9. In each of the embodiments noted in this paragraph, z may be zero.

In one embodiment, the symbols z and w are chosen to make the MOC electrically balanced or neutral.

Among the MOCs contemplated for use in the present invention are the following: $A_{1-x}M_xBO_{3-z}$; $AB_{1-y}M'_yO_{3-z}$; $A_{1-x}M_xB_{1-y}M'_yO_{3-z}$; $2B_2O_{7-w}$; $A_{2-u}M_uB_2O_{7-w}$; and $A_{2-u}M_uB_{2-v}M'_vO_{7-w}$. More specific examples of such MOCs include: $La_{1-x}Sr_xCoO_{3-z}$; $La_{1-x}Pb_xCoO_{3-z}$; $La_{1-x}Th_xCoO_{3-z}$; $Nd_{1-x}Sr_xCoO_{3-z}$; $La_{1-x}Ba_xCoO_{3-z}$; $CaTi_{1-y}Mg_yO_{3-z}$; $SrTi_{1-y}Al_yO_{3-z}$; $YMnO_3$; $FeTiO_3$; $MgTiO_3$; $CoTiO_3$; $NiTiO_3$; $MnTiO_3$; $NiMnO_3$; $CoMnO_3$; $NaSbO_3$; $MgMnO_3$; $MgFeO_3$; $MgCoO_3$; $LaFeO_3$; $LaVO_3$; $La_{1-x}Pb_xMnO_{3-z}$; $La_{1-x}Mg_xFeO_{3-z}$; $La_{1-x}Mg_xMnO_{3-z}$; $CeAl_{1-y}Mg_yO_{3-z}$; $NaNbO_3$; $NaNb_{1-y}Al_yO_{3-z}$; $La_{1x}Mg_x$-$NiO_{3-z}$; $LaNi_{1-y}Mg_yO_{3-z}$; $LaCo_{1-y}Pt_yO_{3-z}$ (Pt may be substituted for in whole or in part by one or more of the other platinum group metals); $La_{1-x}K_xMn_{1-y}Ru_yO_{3-z}$; and $La_{0.6}Sr_{0.4}Co_{0.94}Pt_{0.03}Ru_{0.03}O_3$.

The MOCs useful in this invention can be produced in any suitable manner. Naturally occurring MOCs may be employed. Also, naturally occurring perovskites can be modified to obtain certain of the MPCs. The MOCs are preferably synthetically prepared, e.g., by coprecipitation, of predetermined proportions of the various metals from liquids, e.g., aqueous media, employing soluble salts such as chlorides, nitrates, acetates and the like. Coprecipitation may also be effected using oxides, hydroxides, carbonates, selected chelates such as oxalates and the like. The precipitate is preferably aged at temperatures to maintain a liquid phase in contact with the precipitate, more preferably in the range of about 20° C. to about 95° C. This aging may occur for widely varying periods of time, e.g., for a period of in the range of 4 hours or less to about 90 days or more. In one embodiment, the precipitate slurry is preferably aged for a time in the range of about 8 hours to about 48 hours, more preferably about 16 to about 30 hours, at ambient temperature. Coprecipitation may occur in the presence of an organic template reagent, such as a quaternary ammonium hydroxide or salt.

The aged precipitate may be washed, dried and calcined in air to produce the MOC. The precipitate is desirably washed to remove extraneous ions which may interfere with the functioning of the MOC. The washed precipitate is dried, e.g., at a temperature of less than about 500° F., to remove apparent moisture. The dried precipitate is calcined, preferably in air or other oxygen-containing medium, at a temperature suitable to remove water of hydration, preferably in the range of about 800° F. to about 1500° F. or more, more preferably about 900° F. to about 1500° F., and for a period of time preferably in the range of about 0.5 hour to about 24 hours or more, more preferably about 1 hour to about 10 hours, to convert the precipitate to the desired MOC. The MOC can be mechanically ground to obtain MOC discrete entities of the desired size and shape. Alternately, and preferably, the washed precipitate is spray dried, e.g., using conventional equipment and conditions, to produce spray dried particles which when calcined, e.g., at the above-noted conditions, provide MOC discrete entities of the desired shape and size.

Certain MOC's, and in particular certain MPC's, are effectively prepared by a method which comprises contacting a component, preferably an oxide or oxide precursor, of at least one first metal with a component, preferably an oxide or oxide precursor, of at least one different second metal at conditions effective to thermally convert, preferably thermally condense, these components to form a two metal, oxygen-containing component including both the first and second metals. In one embodiment, the method further comprises subjecting the two metal, oxygen-containing component to effective reducing conditions, preferably in the presence of molecular hydrogen, to form a reduced two metal, oxygen-containing component including both first and second metals. These two metal, oxygen-containing components and reduced two metal oxygen-containing components may include more than two metals, and such multi-metal components are included within the scope of the present invention. The two metal, oxygen-containing components and reduced two metal, oxygen containing components formed are preferably MPC's.

This method provides a very effective and relatively simple way of making MOC's and MPC's. For example, the ratio of first metal components to second metal components may be easily chosen to form the desired final product. In addition, little or no reaction by-product is formed which requires disposal require disposable.

Although any first metal component and second metal component may be utilized in this method, it is preferred that such components be selected from metal oxides, metal oxide precursors and mixtures thereof. By "metal oxide precursors" is meant those components which are effectively converted to metal oxides at the thermal conversion conditions of the contacting step. It is more preferred that the first and second metal components be metal oxides.

The first metal is preferably chosen from metals designated above as A, M and mixtures thereof, while the second metal is preferably chosen from metals designated above as B, M' and mixtures thereof. More preferably, the first metal is selected from the group consisting of lanthanide series metals, Group VIII metals and mixtures thereof. The second metal is more preferably selected from the group consisting of Group VIII metals, titanium, vanadium, manganese, copper, aluminum, chromium, gallium, and mixtures thereof, and still more preferably from Group VIII metals, vanadium and mixtures thereof.

The temperature employed in the thermal conversion or thermolysis reaction step varies depending, for example, on the type of first and second metal components used and the two metal, oxygen containing component desired to be produced. Preferably, this temperature is in the range of about 800° F. to about 1500° F., more preferably about 900° F. to about 1350° F. The first and second metal components may advantageously be finely ground and/or intimately mixed in order to facilitate, e.g., increase the rate of, the thermal conversion reaction or reactions. The contacting time is not critical, provided that sufficient time is allowed to obtain the desired product. Preferably, the thermal takes place for a period of time in the range of about 0.5 hour to about 24 hours or more. This contacting preferably occurs in an oxidizing or inert atmosphere, provided that sufficient oxygen is present to produce the desired two metal, oxygen-containing component.

In certain instances, it is preferred to subject the two metal, oxygen-containing component to effective reducing conditions to obtain a reduced two metal, oxygen-containing component, which may be the desired MOC. The reducing conditions employed are not critical, provided that the two metal, oxygen-containing component is partially chemically reduced. Molecular hydrogen is the preferred reducing agent, although other such agents may be utilized. Reducing temperature and times are chosen based on the particular application involved. In many instances, a temperature of about 300° F. to about 1500° F. and a time in the range of about 0.1 hour to about 24 hours or more are utilized.

This method is illustrated by the thermal conversion of $LaO_3$ and $V_2O_5$, $CeO_2$ and $V_2O_5$, $Fe_2O_3$ and $V_2O_5$ and $Fe_2O_3$ and $La_2O_3$ to form stable $LaVO_4$, $CeVO_3$, $FeVO_4$, and $LaFeO_3$, respectively. The $LaVO_4$ and $FeVO_4$ thus produced can be reduced, with molecular hydrogen, to $LaVO_3$ $FeVO_3$, respectively.

MPC's may be prepared by impregnating particles of perovskite with a predetermined amount of one or more metal salt solutions. The impregnated perovskite particles are dried, e.g., at a temperature of less than about 500° F., and calcined, preferably in air or other oxygen-containing medium, at temperatures, e.g., in the range of about 800° F., to about 1500° F. or more, and for a period of time, e.g., in the range of about 1 to about 24 hours or more, to form the desired MPC.

If desired, the MOC or MOC precursor may be incorporated with/into solid particles of hydrocarbon conversion, e.g., cracking, catalyst and/or particles of porous support material which are substantially inert to the hydrocarbon conversion. Such incorporation can be performed using procedures which are conventional and well known in the art.

The presently useful discrete entities preferably comprise a major amount, more preferably at least about 70% and still more preferably at least about 90%, by weight of one or more MOC.

Substantially non-interfering proportions of other well known refractory material, e.g., inorganic oxides such as alumina, silica, silica-alumina, zirconia, thoria and the like, may be included in the present discrete entities. By substantially "non-interfering" is meant amounts of the material which do not have a substantial deleterious effect on the intended functioning of the present MOC, catalyst system, sulfur oxide removal process, or hydrocarbon conversion process, as the case might be. The inclusion of materials such as alumina, silica, silica-alumina, zirconia, thoria and the like into the present discrete entities may act to improve one or more of the functions and/or properties of the MOC. Free magnesia also may be included in the present discrete entities, e.g., using conventional techniques. For example, in one embodiment the discrete entities preferably includes about 0.1% to about 30% by weight of free magnesia (calculated as MgO). Such free magnesia may act to improve the effectiveness of the MPC to reduce sulfur oxide atmospheric emissions.

The present discrete entities may further comprise at least one crystalline microporous three dimensional solid material, e.g., molecular sieve, capable of promoting the desired hydrocarbon conversion. Typical such materials are described elsewhere herein. Such materials may comprise about 1% to about 30%, for example, about 1% to about 10%, by weight of the discrete entities. The presence of such materials in the present discrete entities acts to increase the overall catalytic activity of the solid particles-discrete entities catalyst system for promoting the desired hydrocarbon conversion.

The thus-produced MOC-containing discrete entities may then be mixed with solid particles of hydrocarbon conversion catalyst and employed in hydrocarbon conversion.

The preferred relative amounts of the solid particles and discrete entities are about 80 to about 99 parts and about 1 to about 20 parts by weight, respectively. This catalyst system is especially effective for the catalytic cracking of a hydrocarbon feedstock to lighter, lower boiling products.

In one embodiment, the MOC preferably has a surface area (by the conventional B.E.T. method) in the range of about $5m^2/gm.$ to about $600m^2/gm.$, more preferably about $10m^2/gm.$ to about $400m^2/gm.$, and still more preferably about $10m^2/gm.$ to about $200m^2/gm.$ These relatively high surface areas have been found to provide for improved reduction in sulfur oxide atmospheric emissions.

The solid particles useful in the present invention are capable of promoting the desired hydrocarbon conversion. By "hydrocarbon conversion" is meant a chemical reaction or conversion in which one or more of the feed materials or reactants and/or one or more of the products (of the conversion) is substantially hydrocarbon in nature, e.g., comprises a major amount of weight of carbon and hydrogen. The presently useful solid particles are further characterized as having a composition (i.e., chemical make-up) which is different from the discrete entities. In one embodiment, the solid particles (or the solid particles portion of the combined particles described herein) are substantially free of MOC.

The composition of the solid particles useful in the present invention is not critical, provided that such particles are capable of promoting the desired hydrocarbon conversion. Solid particles having widely varying same structure number is used for a common structure type with varying framework composition.

TABLE I
ACRONYMS FOR FRAMEWORK COMPOSITIONS

| $TO_2$, T= | Acronym | $TO_2$, T= | Acronym | $TO_2$, T= | Acronym |
|---|---|---|---|---|---|
| | | | | Other Elements: | |
| Si,Al,P | SAPO | Me,Al,P,Si | MeAPSO | El,Al,P | ElAPO |
| | | Fe,Al,P,Si | FAPSO | El,Al,P,Si | ElAPSO |
| Me,Al,P | MeAPO | Mg,Al,P,Si | MAPSO | | |
| Fe,Al,P | FAPO | Mn,Al,P,Si | MnAPSO | | |
| Mg,Al,P | MAPO | Co,Al,P,Si | CoAPSO | | |
| Mn,Al,P | MnAPO | Zn,Al,P,Si | ZAPSO | El = As,Be,B,Cr, | |
| Co,Al,P | CoAPO | | | Ga,Li,V,Ti | |
| Zn,Al,P | ZAPO | | | | | ing compositions are conventionally used as catalyst in such hydrocarbon conversion processes, the particular composition chosen being dependent, for example, on the type of hydrocarbon chemical conversion desired. Thus, the solid particles suitable for use in the present invention include at least one of the natural or synthetic materials which are capable of promoting the desired hydrocarbon chemical conversion. For example, when the desired hydrocarbon conversion involves one or more of hydrocarbon cracking (preferably in the substantial absence of added free molecular hydrogen), disproportionation, isomerization, hydrocracking, reforming, dehydrocyclization, polymerization, alkylation and dealkylation, such suitable materials include acid-treated natural clays, such as montmorillonite, kaolin and bentonite clays; natural or synthetic amorphous materials, such as alumina, silica, silica-alumina, silica-magnesia and silica-zirconia composites; crystalline microporous three dimensional solid materials or CMSMs often referred to as molecular sieves, such as aluminosilicates, ALPOs, SAPOs, MeAPOs, MeAPSOs, ELAPOs, ELAPSOs and the like. Certain of these CMSMs materials are discussed in U.S. Pat. Nos. 4,310,440; 4,440,871; 4,500,651; and U.S. Pat. No. 4,503,023, each of which patents is incorporated by reference herein. Certain of these CMSMs, e.g., the ALPOs, SAPOs, MeAPOs, MeAPSOs, ELAPOs and ELAPSOs, can be described with reference to the following paragraph and table from: Flanegen et al, "Aluminophosphate Molecular Sieves and the Periodic Table," published in the "New Developments and Zeolite Science Technology" Proceedings of the 7th International Zeolite Conference, edited by Y. Murakami, A. Iijima and J. W. Ward, pages 103–112 (1986), which is incorporated in its entirety herein by reference.

The materials are classified into binary (2), ternary (3), quaternary (4), quinary (5), and senary (6) compositions based on the number of elements contained in the catonic framework sites of any given structure. A normalized $TO_2$ formula represents the relative concentration of framework elements in the composition, $(El_xAl_yP_z)O_2$, where El is the incorporated element and x, y and z are the mole fractions of the respective elements in the composition. Acronyms describing the framework composition are shown in Table 1, e.g., SAPO=(Si, Al, P)$O_2$ composition. The structure type is indicated by an integer following the compositional acronym, e.g., SAPO-5 is a (Si, Al, P)$O_2$ composition with the type 5 structure. The numbering of the structure type is arbitrary and bears no relationship to structural numbers used previously in the literature, e.g, ZSM-5, and only identifies structures found in the aluminophosphate-based molecular sieves. The In certain instances, e.g., hydrocarbon cracking and disproportionation, the solid particles preferably include such CMSMs to increase catalytic activity. Methods for preparing such solid particles and the combined solid particles-discrete entities particles are conventional and well known in the art. For example, crystalline aluminosilicate compositions can be made from alkali metal silicates and alkali metal aluminates so that they initially contain significant concentrations of alkali metals. Sodium tends to reduce the catalyst activity of the composition for hydrocarbon conversion reactions such as hydrocarbon cracking and disproportionation. Accordingly, most or all of the sodium in the crystalline aluminosilicate is removed or replaced, e.g., with other metal cations such aluminum ions or ions of the rare earths, which are associated with the crystalline aluminosilicates. This can be accomplished by contacting the crystalline aluminosilicate with a source of hydrogen ions such as acids, or hydrogen precursors such as ammonium compounds. These procedures are thoroughly described in U.S. Pat. Nos. 3,140,253 and 27,639.

Compositions of the solid particles which are particularly useful in the present invention are those in which the CMSM is incorporated in an amount effective to promote the desired hydrocarbon conversion, e.g., a catalytically effective amount, into a porous matrix which comprises, for example, amorphous material which may or may not be itself capable of promoting such hydrocarbon conversion. Included among such matrix materials are clays and amorphous compositions of alumina. silica, silica-alumina, magnesia, zirconia, mixtures of these and the like. The CMSM is preferably incorporated into the matrix material in amounts within the range of about 1% to about 75%, more preferably about 2% to about 50%, by weight of the total solid particles. The preparation of CMSM-amorphous matrix catalytic materials is described in the above-mentioned patents. Catalytically active CMSMs which are formed during and/or as part of the methods of manufacturing the solid particles, discrete entities and/or as part of the methods of manufacturing the solid particles, discrete entities and/or combined particles are within the scope of the present invention.

The solid particles useful in the catalytic hydrocarbon cracking embodiment of the present invention may be any conventional catalyst capable of promoting hydrocarbon cracking at the conditions present in the reaction zone, i.e., hydrocarbon cracking conditions. Similarly, the catalytic activity of such solid particles is restored at the conditions present in the regeneration zone. Typical among these conventional catalysts are those which comprise at least one CMSM having pore diameters of about 8 angstroms to about 15 angstroms and mixtures thereof. When the solid particles and/or discrete entities to be used in the hydrocarbon cracking embodiment of the present invention contain CMSMs, the CMSMs may include minor amounts of conventional metal promoters such as the rare earth metals, in particular, cerium.

This invention can be used with the catalyst (solid particles and discrete entities) being disposed in any conventional reactor-regenerator system in fixed catalyst bed systems, in ebullating catalyst bed systems, in systems which involve continuously conveying or circulating catalyst between reaction zone and regeneration zone and the like. Circulating catalyst systems are preferred. Typical of the circulating catalyst bed systems are the conventional moving bed and fluidized bed reactor-regenerator systems. Both of these circulating bed systems are conventionally used in hydrocarbon conversion, e.g., hydrocarbon cracking, operations with the fluidized catalyst bed reactor-regenerator systems being preferred.

Although the presently useful solid particles and discrete entities may be used as a physical admixture of separate particles, in one embodiment, the discrete entities are combined as part of the solid particles. That is, the discrete entities, e.g., comprising calcined microspheres of the MOC, are combined with the solid particles, e.g., during the manufacture of the solid particles, to form combined particles which function as both the presently useful solid particles and discrete entities. In this embodiment the discrete entities are preferably a separate and distinct phase in the combined particles. One preferred method for providing the combined particles is to calcine the discrete entities prior to incorporating the discrete entities into the combined particles.

The form, i.e., particle size and shape, of the present particles, e.g., both solid particles and discrete entities as well as the combined particles, is not critical to the present invention and may vary depending, for example, on the type of reaction-regeneration system employed. Such particles may be formed into any desired shape such as pills, cakes, extrudates, powders, granules, spheres and the like, using conventional methods. Where, for example, the final particles are designed for use as a fixed bed, the particles may preferably be formed into particles having a minimum dimension of at least about 0.01 inch and a maximum dimension of up to about one-half inch or one inch or more. Spherical particles having a diameter of about 0.03 inch to about 0.25 inch, preferably about 0.03 inch to about 0.15 inch, are often useful, especially in fixed bed or moving bed operations. With regard to fluidized systems, it is preferred that the major amount by weight of the particles have a diameter in the range of about 10 microns to about 250 microns, more preferably about 20 microns to about 150 microns.

Athough this invention is useful in many hydrocarbon conversions, the present catalyst, i.e., mixture comprising solid particles and discrete entities, and hydrocarbon conversion process find particular applicability in systems for the catalytic cracking of hydrocarbons where oxidative regeneration of catalyst is employed. Such catalytic hydrocarbon cracking often involves converting, i.e., cracking, heavier or higher boiling components, to gasoline and other lower boiling components, such as hexane, hexene, pentane, pentene, butane, butylene, propane, propylene, ethane, ethylene, methane and mixtures thereof. Often, the substantially hydrocarbon feedstock comprises a gas oil fraction, e.g., derived from petroleum, shale oil, tar sand oil, coal and the like. Such feedstock may comprise a mixture of straight run, e.g., virgin, gas oil. Such gas oil fractions often boil primarily in the range of about 400° F. to about 1000° F. Other substantially hydrocarbon feedstocks, e.g., naphtha, high boiling or heavy fractions of petroleum, petroleum residuum, shale oil, tar sand oil, coal and the like, may be cracked using the catalyst and method of the present invention. Such substantially hydrocarbon feedstock often contains minor amounts of other elements, e.g., sulfur, nitrogen, oxygen and the like. In one aspect, the present invention involves converting a hydrocarbon feedstock containing sulfur and/or sulfur chemically combined with the molecules of hydrocarbon feedstock. The present invention is particularly useful when the amount of sulfur in such hydrocarbon feedstock is in the range of about 0.01% to about 5%, preferably about 0.1% to about 3%, by weight of the total feedstock.

Hydrocarbon cracking conditions are well known and often include temperatures in the range of about 850° F. to about 1100° F., preferably about 900° F. to about 1050° F. Other reaction conditions may include pressures of up to about 100 psig.; catalyst to oil ratios of about 1 to 2 to about 25 to 1, preferably about 3 to 1 to about 15 to 1; and weight hourly space velocities (WHSV) of about 3 to about 60. These hydrocarbon cracking conditions may be varied depending, for example, on the feedstock and solid particles or combined particles being used, the reactor-regenerator system, e.g., fluid or moving bed catalytic cracking system, being employed and the product or products wanted.

In addition, the catalytic hydrocarbon cracking system includes a regeneration zone for restoring the catalytic activity of the solid particles or combined particles of catalyst previously used to promote hydrocarbon cracking. Carbonaceous, in particular sulfur-containing carbonaceous, deposit-containing catalyst particles from the reaction zone are contacted with free oxygen-containing gas in the regeneration zone at conditions to restore or maintain the activity of the catalyst by removing, i.e., combusting, at least a portion of the carbonaceous material from the catalyst particles. When the carbonaceous deposit material contains sulfur, at least one sulfur-containing combustion product is produced in the regeneration zone and may leave the zone with the regenerator flue gas. The conditions at which such free oxygen-containing gas contacting takes place may vary, for example, over conventional ranges. The temperatures in the catalyst regeneration zone of a hydrocarbon cracking system are often in the range of about 900° F. to about 500° F., preferably about 1100° F. to about 1350° F. and more preferably about 1100° F. to about 1300° F. Other conditions within such regeneration zone may include, for example, pressures up to about 100 psig., and average catalyst contact times within the range of about 3 minutes to about 75 minutes. Sufficient oxygen may be present in the regeneration zone to completely combust the carbon and hydrogen of the carbonaceous deposit material, for example, to carbon dioxide and water. However, one advantage of the present invention is that substantial reduction in sulfur oxide emissions are obtained even when the catalyst regeneration zone is operated in a partial combustion mode, i.e., operated with insufficient oxygen to completely combust the carbon and hydrogen of the carbonaceous deposit material. The amount of carbonaceous material deposited on the catalyst in the reaction zone is preferably in the range of about 0.005% to about 15%, more preferably about 0.1% to about 10%, by weight of the catalyst. The amount of sulfur, if any, contained in the carbonaceous deposit material depends, for example, on the amount of sulfur in the hydrocarbon feedstock. This deposit material may contain about 0.01% to about 10% or more by weight of sulfur. At least a portion of the regenerated catalyst is often returned to the hydrocarbon cracking reaction zone.

The following examples are provided to better illustrate the invention, without limitation, by presenting various specific embodiments of the present invention.

EXAMPLE 1

A modified perovskite-type component, having an empirical $La_{0.8}Mg_{0.2}MnO_3$, was prepared by the following procedure.

A lanthanum nitrate solution was prepared by dissolving 225.17 g. lanthanum nitrate hexahydrate in 170 ml. water.

A magnesium nitrate solution was prepared by dissolving 33.33 g. of the salt in 35 ml. water.

A manganese nitrate solution was prepared by adding 223.68 g. of a 52 weight percent aqueous solution of the salt to 300 ml. water.

The three solutions were blended in a large vessel, with stirring, while adding 232.85 g. n-butylamine over the course of 1.5 hours. The final pH was 9.5. The slurry was stored or aged quiescently for 16 hours, filtered, washed with water, washed with ethanol, and dried in vacuo at about 240° F. for 16 hours. The dried precipitate was ground to pass through a 40-mesh screen and then calcined in flowing air at 1350° F. for 3 hours to yield Discrete Entity I.

EXAMPLE II–VI

The procedure of Example I was repeated, with appropriate changes in the salts employed, to yield the following components:

| Discrete Entity II | $MgMnO_3$ |
| Discrete Entity III | $La_{0.2} Mg_{0.8} MnO_3$ |
| Discrete Entity IV | $La_{0.8} Mg_{0.2} CoO_3$ |
| Discrete Entity V | $La_{0.5} Mg_{0.5} CoO_3$ |
| Discrete Entity VI | $La_{0.8} Mg_{0.2} FeO_3$ |

EXAMPLE VII

Pickup of $SO_2$ under oxidizing conditions was determined by the following procedure.

The Discrete Entities I, II, III, IV and V were separately blended with a commercially available crystalline aluminosilicate-containing equilibrium fluid catalytic cracking (FCC) catalyst in a fluidized bed reactor to provide a concentration of 1.5 wt. percent of the component. Each blend was then heated to 1350° F. under flowing nitrogen. After 0.5 hour the nitrogen flow was stopped and nitrogen-diluted air (5.9 volume percent $O_2$) was passed through the fluid bed. After 2 minutes, an $SO_2$ stream was added to provide an $SO_2$ concentration of 1.5 volume percent. This treatment was maintained for 15 minutes. The $SO_2$ addition was stopped and the diluted air stream was continued for an additional 4 minutes. Thereafter the air was stopped and nitrogen was introduced for 10 minutes at 1350° F. The catalyst system was then cooled down under nitrogen. The effluent gases were collected in a $H_2O_2$ trap and titrated with standardized Ba Cl $O_4$ solution according to EPA method No. 6 to determine the quantity of $SO_2$ in the effluent stream. Pickup of sulfur by the blend was calculated by difference from the total exposure to $SO_2$. Results are presented in Table I.

EXAMPLE VIII

Each of the blends of Example VII, containing picked-up sulfur, was subjected to the following procedure. After flushing with nitrogen, the fluidized bed was brought to 1350° F. and the subject blend was subjected to a hydrogen stream for 5 minutes, followed by flushing with nitrogen.

The $SO_2$ pickup-$H_2$ exposure cycle was repeated a number of times with each of the blends. The ability to pickup sulfur on each cycle is reported in Table I.

EXAMPLE IX

The hydrogen effluents, from the tests in Example VIII of the blend employing Discrete Entities IV, were collected in a standard caustic solution and the amount of sulfur removed from the blend, as a percentage of the sulfur picked up in the $SO_2$ pickup portion of the cycle, was determined. The removal of sulfur in successive cycles is reported in Table II.

EXAMPLE X

Pickup of sulfur under non-oxidizing conditions was determined by the following procedure.

Discrete Entities I, IV and VI were separately blended with a commercially available crystalline aluminosilicate-containing equilibrium FCC catalyst in a fluidized bed reactor to provide a concentration of 2.0 wt. percent of the modified perovskite-type component. Each blend was heated to the selected temperature, ranging from 500° to 1350° F., in a stream of nitrogen and the final conditions were maintained for 0.5 hour. A gas stream containing 1500 ppm of $SO_2$ was passed through the fluidized bed for 30 minutes. The effluent was collected and analyzed as in Example VII. The pickup of sulfur is reported in Table III.

TABLE I

| SULFUR PICKUP: OXIDATIVE CONDITIONS | | | | | |
|---|---|---|---|---|---|
| Sulfur Pickup, | Catalyst Blend | | | | |
| % of total $SO_2$ | I | II | III | IV | V |
| Initial | 95 | 96 | 89 | 69 | 87 |
| Cycle 1 | 50 | 64 | 27 | 33 | 59 |
| Cycle 2 | 49 | 45 | 18 | 28 | 57 |
| Cycle 3 | 48 | 35 | 12 | 29 | 48 |
| Cycle 4 | 46 | 30 | 15 | 26 | 43 |
| Cycle 5 | — | 32 | 9 | 24 | — |
| Cycle 6 | — | — | — | 26 | — |

TABLE II

| SULFUR REDUCTION | |
|---|---|
| | $SO_2$ Removal, % |
| Cycle 1 | 38 |
| 2 | 99 |
| 3 | 89 |
| 4 | 99 |

TABLE III

| SULFUR PICKUP: NON-OXIDATIVE CONDITIONS | | | | |
|---|---|---|---|---|
| Sulfur Pickup, % of total $SO_2$ | Catalyst Blend | | | |
| Temperature, °F. | I | II | IV | Blank[a] |
| 500 | — | 12 | — | — |

TABLE III-continued

SULFUR PICKUP: NON-OXIDATIVE CONDITIONS

| Sulfur Pickup, % of total $SO_2$ Temperature, °F. | Catalyst Blend | | | |
|---|---|---|---|---|
| | I | II | IV | Blank[a] |
| 800 | — | 16 | — | — |
| 1000 | — | 31 | — | — |
| 1200 | — | 63 | — | — |
| 1350 | 52 | 83 | 36 | 8 |

[a]100 wt. percent equilibrium FCC catalyst.

These results demonstrate that the presently useful metal, oxygen-containing components are effective to pickup sulfur dioxide under both oxidative and non-oxidative conditions. In addition, the results show that the picked-up sulfur can be released from the components at conditions such that absorbed sulfur can be effectively released in the reaction zone of a hydrocarbon catalytic cracking zone.

EXAMPLES XI–XV

Five blends, each similar in composition to a different one of the blends in Example VII, are each used in a conventional fluid bed catalytic cracking operation to produce gasoline and other lower boiling components from a sulfur-containing gas oil fraction. Each of the blends is effective to promote the desired hydrocarbon cracking. In each instance the catalyst regenerator is operated in both a full combustion mode and a partial combustion mode. In all instances, the amount of sulfur oxides emitted to the atmosphere from the catalyst regenerators is reduced relative to similar operations without the metal, oxygen-containing component.

While this invention has been described with respect to various specific examples and embodiments, it is to be understood that the present invention is not limited thereto and that it can be variously practiced within the range of the following claims.

What is claimed is:

1. A process for the removal of sulfur oxides from a gas which comprises (a) contacting said sulfur oxide-containing gas with at least one metal, oxygen-containing component at conditions effective to associate at least a portion of said sulfur oxides with said component to reduce the amount of sulfur oxides in said gas; and (b) contacting said component containing associated sulfur oxides at conditions effective to reduce the amount of sulfur associated with said component, said component having an empirical formula selected from the following: (1) $A_{1-x}M_xB_{1-y}M'_yO_{3-z}$; (2) $A_2B_2O_{7-w}$; and (3) $A_{2-u}M_uB_{2-v}M'_vO_{7-w}$ wherein A is selected from the group consisting of the lanthanide series metals, alkaline earth metals, sodium, potassium, cesium and mixtures thereof; M is different from A, B and M' and is selected from the group consisting of alkaline earth metals, Group VIII metals, manganese, lead, zinc, thorium, yttrium cerium and mixtures thereof; B and M' are different from each other and are independently selected from the group consisting of Group VIII metals, magnesium, titanium, manganese, copper, aluminum, niobium, tantalum, chromium, gallium, zirconium, vanadium, molybdenum, antimony, bismuth, tin, tungsten and mixtures thereof; x and y are independently in the range of 0 to 1 so that the total number of positive charges from A, M, B and M' in empirical formula (1) is within the range of about 5 to about 7, u and v are independently in the range of 0 to 2 so that the total number of positive charges for A, M, B and M' in empirical formula (3) is within the range of about 12 to about 16, z is in the range of about −0.5 to about 0.5 and w is in the range of about −1 to about 1, provided that not all of x, y and z are zero in empirical formula (1) and not all of u, v and w are zero in empirical formula (3), and further provided that when B is niobium, A is selected from sodium, potassium, cesium and mixtures thereof.

2. The process of claim 1 which further comprises (c) repeating steps (a) and (b) periodically.

3. The process of claim 1 wherein step (b) takes place in the presence of a reducing medium.

4. The process of claim 1 wherein A is selected from the group consisting of lanthanide series metals and mixtures thereof, M is selected from the group consisting of alkaline earth metals, cobalt, iron, nickel, manganese and mixtures thereof, B is selected from the group consisting of cobalt, iron, nickel, ruthenium, titanium, vanadium, manganese, copper, lead, aluminum, chromium, gallium and mixtures thereof; and M' is selected from the group consisting of magnesium, aluminum, vanadium the platinum group metals and mixtures thereof.

5. The process of claim 1 wherein said component has a net positive charge.

6. The process of claim 1 wherein said component has a surface area in the range of about $5m^2/gm$. to about $600m^2/gm$.

7. The process of claim 1 wherein said component has empirical formula (1).

8. The process of claim 6 wherein x is in the range of about 0.01 to about 0.99, and y is zero.

9. The process of claim 7 wherein x is in the range of about 0.05 to about 0.9.

10. The process of claim 7 wherein x is zero and y is in the range of about 0.01 to about 0.99.

11. The process of claim 10 wherein y is in the range of about 0.05 to about 0.9.

12. The process of claim 7 wherein z is in the range of about 0.01 to about 0.5.

13. The process of claim 7 wherein z is in the range of about 0.05 to about 0.4.

14. The process of claim 7 wherein x and y are independently in the range of about 0.01 to about 0.99.

15. The process of claim 7 wherein x and y are independently in the range of about 0.05 to about 0.9.

* * * * *